(12) United States Patent
Hwang et al.

(10) Patent No.: US 12,145,746 B2
(45) Date of Patent: Nov. 19, 2024

(54) DRONE DOCKING STATION FOR VEHICLE AND METHOD FOR CONTROLLING THE SAME

(71) Applicants: Hyundai Motor Company, Seoul (KR); Kia Corporation, Seoul (KR); Yong San Co., Ltd., Ulsan (KR)

(72) Inventors: Jin Ho Hwang, Cheonan-Si (KR); Sang Heon Lee, Seoul (KR); Dong Eun Cha, Hwaseong-Si (KR); Choon Taik Kim, Yongin-Si (KR); Sang Hoon Lee, Asan-Si (KR); Hong Kwon Moon, Cheonan-Si (KR)

(73) Assignees: Hyundai Motor Company, Seoul (KR); Kia Corporation, Seoul (KR); Yong San Co., Ltd., Ulsan (KR)

( * ) Notice: Subject to any disclaimer, the term of this patent is extended or adjusted under 35 U.S.C. 154(b) by 128 days.

(21) Appl. No.: 17/974,353

(22) Filed: Oct. 26, 2022

(65) Prior Publication Data
US 2023/0219697 A1    Jul. 13, 2023

(30) Foreign Application Priority Data

Jan. 12, 2022 (KR) ........................ 10-2022-0004505

(51) Int. Cl.
*B64F 1/32* (2006.01)
*B64C 39/02* (2023.01)
(Continued)

(52) U.S. Cl.
CPC .............. *B64F 1/32* (2013.01); *B64C 39/024* (2013.01); *B64D 1/02* (2013.01); *B64U 80/86* (2023.01);
(Continued)

(58) Field of Classification Search
CPC ...... B64F 1/32; B64F 1/00; B64F 1/18; B64F 1/007; B64F 1/222; B64C 39/024;
(Continued)

(56) References Cited

U.S. PATENT DOCUMENTS 2,395,528 A * 2/1946 Andersen .................. B64F 1/24
104/44
3,035,528 A * 5/1962 Bolton ...................... B64F 1/24
104/44
(Continued)

FOREIGN PATENT DOCUMENTS

| JP | 6937346 | 9/2021 |
|---|---|---|
| KR | 10-2020-0013352 | 2/2020 |
| KR | 10-2185771 | 12/2020 |

*Primary Examiner* — Medhat Badawi
(74) *Attorney, Agent, or Firm* — Morgan, Lewis & Bockius LLP (57) ABSTRACT

A drone docking station for a vehicle includes: a transfer device configured to have a cargo loaded on a drone or to vertically move the cargo transferred by the drone; a guide device including a guide panel provided on a roof of the vehicle and connected to an upper end portion of the transfer device to have the drone accommodated on an upper portion of the guide panel, wherein the guide panel is disposed to surround the transfer device and provided to move inward or outward or to be rotated around a center portion of the transfer device; and a control unit electrically connected to the guide device and configured to rotate or move the guide panel so that the drone corresponds to the cargo positioned in the transfer device when the drone is accommodated on the guide panel.

18 Claims, 9 Drawing Sheets

(51) Int. Cl.
  *B64D 1/02* (2006.01)
  *B64U 80/86* (2023.01)
  *B64U 101/60* (2023.01)
(52) U.S. Cl.
  CPC ...... *B64U 2101/60* (2023.01); *B64U 2201/10* (2023.01)
(58) Field of Classification Search
  CPC . B64D 1/02; B64D 9/00; B64U 80/86; B64U 2101/60; B64U 2201/10; B60P 1/44; B60P 1/4421; B60P 3/11; B60P 1/02; B60P 1/42; B65G 35/06; F16H 19/04; F16H 25/20
  See application file for complete search history.

(56) References Cited

U.S. PATENT DOCUMENTS

| | | | | |
|---|---|---|---|---|
| 5,988,564 | A * | 11/1999 | Lee | B64F 1/24 244/116 |
| 6,295,007 | B1 * | 9/2001 | O'Meara | G08G 5/0026 340/953 |
| 9,302,783 | B2 * | 4/2016 | Wang | B60R 9/00 |
| 9,387,928 | B1 * | 7/2016 | Gentry | G08G 5/0039 |
| 9,387,940 | B2 * | 7/2016 | Godzdanker | B64F 1/12 |
| 9,460,616 | B1 * | 10/2016 | Miyahira | G08G 1/0967 |
| 9,563,201 | B1 * | 2/2017 | Tofte | G05D 1/0038 |
| 9,576,482 | B2 * | 2/2017 | Yamamoto | H04W 4/027 |
| 9,637,233 | B2 * | 5/2017 | Bivens | A01K 15/00 |
| 10,182,215 | B1 * | 1/2019 | Jacob | B60F 5/02 |
| 10,207,820 | B2 * | 2/2019 | Sullivan | B64U 70/99 |
| 10,239,638 | B1 * | 3/2019 | Cohen | B64F 1/027 |
| 10,274,952 | B2 * | 4/2019 | Cantrell | G05D 1/0094 |
| 10,457,421 | B2 * | 10/2019 | O'Toole | B64F 1/32 |
| 10,543,984 | B1 * | 1/2020 | Alduaiji | G06Q 10/08 |
| 10,577,099 | B2 * | 3/2020 | Akens | B64U 10/14 |
| 11,068,836 | B2 | 7/2021 | Burch, V et al. | |
| 11,180,263 | B2 * | 11/2021 | Ratajczak | B60L 53/14 |
| 11,440,679 | B2 * | 9/2022 | Cowden | B64U 80/30 |
| 11,667,402 | B2 * | 6/2023 | Liske | B64F 1/322 244/116 |
| 11,673,690 | B2 * | 6/2023 | Dayan | B64U 10/60 244/114 R |
| 11,748,688 | B2 * | 9/2023 | Ur | B64C 39/024 705/332 |
| 11,789,469 | B1 * | 10/2023 | Ciliberti | B64D 1/22 701/120 |
| 11,932,315 | B2 * | 3/2024 | Hwang | B64F 1/32 |
| 2015/0158599 | A1 * | 6/2015 | Sisko | B64F 1/20 244/114 R |
| 2015/0183528 | A1 * | 7/2015 | Walsh | A47G 29/141 244/114 R |
| 2016/0011592 | A1 * | 1/2016 | Zhang | B64C 39/024 244/114 R |
| 2016/0039300 | A1 * | 2/2016 | Wang | B64U 50/39 244/58 |
| 2016/0039541 | A1 * | 2/2016 | Beardsley | B64F 1/362 701/2 |
| 2016/0093218 | A1 * | 3/2016 | Hale | G08G 5/0091 701/120 |
| 2016/0101855 | A1 * | 4/2016 | Stefani | G08G 5/0008 701/2 |
| 2016/0101874 | A1 * | 4/2016 | McKinnon | A47G 29/14 244/114 R |
| 2016/0130000 | A1 * | 5/2016 | Rimanelli | B64U 10/70 244/2 |
| 2016/0137293 | A1 * | 5/2016 | Santangelo | B64U 60/60 244/50 |
| 2016/0137304 | A1 * | 5/2016 | Phan | B64F 3/02 244/17.23 |
| 2016/0144982 | A1 * | 5/2016 | Sugumaran | B64F 1/12 244/108 |
| 2016/0185466 | A1 * | 6/2016 | Dreano, Jr. | A47G 29/141 705/26.81 |
| 2016/0196756 | A1 * | 7/2016 | Prakash | G06Q 10/083 701/3 |
| 2016/0229299 | A1 * | 8/2016 | Streett | B60L 53/12 |
| 2016/0244162 | A1 * | 8/2016 | Weller | B64C 39/024 |
| 2016/0257424 | A1 * | 9/2016 | Stabler | B64F 1/20 |
| 2016/0257426 | A1 * | 9/2016 | Mozer | B64U 70/99 |
| 2016/0311329 | A1 * | 10/2016 | Rodriguez | H02J 7/00 |
| 2016/0364989 | A1 * | 12/2016 | Speasl | G08G 5/0069 |
| 2017/0015415 | A1 * | 1/2017 | Chan | B60L 53/665 |
| 2017/0023949 | A1 * | 1/2017 | Fisher | B64D 47/08 |
| 2017/0050749 | A1 * | 2/2017 | Pilskalns | B64F 1/12 |
| 2017/0073084 | A1 * | 3/2017 | Mozer | B64U 80/25 |
| 2017/0096222 | A1 * | 4/2017 | Spinelli | B64C 39/024 |
| 2017/0121023 | A1 * | 5/2017 | High | B64D 9/00 |
| 2017/0129603 | A1 * | 5/2017 | Raptopoulos | B64C 39/024 |
| 2017/0144776 | A1 * | 5/2017 | Fisher | B64F 1/24 |
| 2017/0240062 | A1 * | 8/2017 | Jaiswal | B64U 70/95 |
| 2017/0253349 | A1 * | 9/2017 | Wang | B64U 70/97 |
| 2017/0313422 | A1 * | 11/2017 | Gil | G06Q 10/0832 |
| 2017/0344000 | A1 * | 11/2017 | Krishnamoorthy | B64F 1/35 |
| 2018/0118340 | A1 * | 5/2018 | Russo | A01K 59/00 |
| 2018/0141680 | A1 * | 5/2018 | Heinonen | B60L 53/14 |
| 2018/0148170 | A1 * | 5/2018 | Stamatovski | B64F 1/18 |
| 2018/0178665 | A1 * | 6/2018 | Chen | B64U 50/37 |
| 2018/0229852 | A1 * | 8/2018 | Boss | B60L 53/14 |
| 2018/0312276 | A1 * | 11/2018 | Miller | B64F 1/125 |
| 2019/0002127 | A1 * | 1/2019 | Straus | B64U 50/37 |
| 2019/0023113 | A1 * | 1/2019 | Stoltz | F01K 23/02 |
| 2019/0023416 | A1 * | 1/2019 | Borko | B65G 1/0435 |
| 2019/0039751 | A1 * | 2/2019 | Janssen | G08G 5/0069 |
| 2019/0100108 | A1 * | 4/2019 | Davis | B64U 80/84 |
| 2019/0161190 | A1 * | 5/2019 | Gil | B64U 10/16 |
| 2019/0245365 | A1 * | 8/2019 | Farrahi Moghaddam | B64C 39/024 |
| 2019/0276140 | A1 * | 9/2019 | Poltorak | B64C 17/02 |
| 2019/0291961 | A1 * | 9/2019 | Urban | G06Q 10/0832 |
| 2019/0315235 | A1 * | 10/2019 | Kung | B64U 50/39 |
| 2019/0348862 | A1 * | 11/2019 | Obayashi | B64U 50/38 |
| 2020/0055613 | A1 * | 2/2020 | Miller | B64F 1/222 |
| 2020/0130864 | A1 * | 4/2020 | Brockers | B64F 1/007 |
| 2020/0165008 | A1 * | 5/2020 | Krauss | B64F 1/12 |
| 2020/0207484 | A1 * | 7/2020 | Foggia | B64F 1/36 |
| 2020/0288895 | A1 * | 9/2020 | Bennet | H04W 12/03 |
| 2020/0346736 | A1 * | 11/2020 | Krasnoff | B64C 3/56 |
| 2021/0125503 | A1 * | 4/2021 | Henry | G05D 1/606 |
| 2021/0148131 | A1 * | 5/2021 | Wankewycz | H02J 7/00 |
| 2021/0171218 | A1 * | 6/2021 | Scherz | B64U 80/25 |
| 2022/0247346 | A1 * | 8/2022 | Dussault | H02S 40/10 |
| 2023/0219697 | A1 * | 7/2023 | Hwang | B64F 1/32 244/114 R |
| 2023/0249761 | A1 * | 8/2023 | Hwang | B64F 1/007 244/110 E |
| 2023/0347804 | A1 * | 11/2023 | Grell | B64C 39/024 |

* cited by examiner

DRONE DOCKING STATION FOR VEHICLE AND METHOD FOR CONTROLLING THE SAME

CROSS REFERENCE TO RELATED APPLICATION

The present application claims priority to Korean Patent Application No. 10-2022-0004505 filed Jan. 12, 2022, the entire contents of which is incorporated herein for all purposes by this reference.

BACKGROUND OF THE INVENTION

Field of the Present Disclosure

The present disclosure relates to a drone docking station for a vehicle and a method for controlling the same, and specifically, to a technology relating to a drone docking station provided in a vehicle to deliver a cargo loaded in the vehicle through a drone.

Description of Related Art

A drone is being used in various fields because it has the advantage of facilitating unmanned, autopilot, and hovering compared to the conventional aerial vehicle. The drone is being expanded to achieve public purposes in the fields of military, measurement, filming, disaster prevention, and security, and will be used for transportation and delivery works, centering on Amazon (DHL, Korea Express, etc.) companies in the industrial field. A technology of securing flight safety of the drone, an autopilot technology up to a target point, an automatic take-off and landing technology, an automatic article loading and unloading technology, and a technology of extending a stable flight time are required to use the drone for the above works. Recently, an artificial intelligence (AI) technology has also been introduced to control the drone flight, and the present technology is approaching an autonomous flight stage that automatically recognizes nearby obstacles and automatically avoids collision with the obstacles.

A technology of docking the drone to a roof portion of the vehicle and transferring the cargo of the vehicle toward the roof to load the cargo on the drone or to transfer the cargo delivered from the drone from the roof side to the vehicle has been required to deliver the cargo transferred to the vehicle to the customer by use of the present drone.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a drone docking station for a vehicle, which may be provided in a vehicle to transfer a cargo to the roof side and to dock a drone to the roof side to dock the drone to the roof side of a freight vehicle to load the cargo of the vehicle on the drone.

A drone docking station for a vehicle according to an exemplary embodiment of the present disclosure includes: a transfer device configured to have a cargo loaded on a drone or to vertically move the cargo transferred by the drone; a guide device including a guide panel provided on a roof of the vehicle and connected to an upper end portion of the transfer device to have the drone accommodated on an upper portion of the guide panel, wherein the guide panel is disposed to surround the transfer device and provided to move inward or outward or to be rotated around a center portion of the transfer device; and a control unit electrically connected to the guide device and configured to rotate or move the guide panel so that the drone corresponds to the cargo positioned in the transfer device when the drone is accommodated on the guide panel.

The drone docking station may further include a base panel provided under the guide panel and provided with a through hole through which the cargo passes by having a center portion penetrated to be connected to the transfer device; and an actuator provided above the base panel and connected to the guide panel to slide or rotate the guide panel.

The actuator may include a lead screw extending outwardly from the middle portion of the base panel, a screw nut engaged with the lead screw and moved in a direction in which the lead screw extends depending upon the rotation of the lead screw and coupled to the guide panel on an upper portion of the screw nut, and a first driving motor engaged to the lead screw to rotate the lead screw.

The lead screw and a pinion gear may be provided to correspond to a number of a plurality of guide panels, in which the actuator may include a first gear provided on the end portion of the lead screw and a first rack gear formed in a shape of a circle to be gear-engaged with the first gears, and the first driving motor may be provided with a second gear on a rotation shaft, and the second gear may be connected to the first rack gear to rotate a plurality of lead screws depending upon the rotation of the first driving motor.

The drone docking station may further include a rotation bearing rotatably coupling the base panel to a roof panel, in which the actuator may include a second driving motor connected to the roof panel and engaged to the base panel to rotate the base panel and the guide panel connected to an upper portion of the base panel.

The actuator may include a second rack gear extending in a shape of a circle along an external surface of the base panel and coupled thereto, and a rotation shaft of the second driving motor may be provided with a third gear engaged with the second rack gear to rotate the second rack gear according to the rotation of the second driving motor.

The transfer device may include a rail vertically extending, a loading plate connected to the rail to be vertically slid along the rail and having the cargo loaded on the loading plate, and a driving device coupled to the rail to vertically move the loading plate.

The drone docking station may further include a sunroof glass provided on a roof panel to cover the guide panel and the transfer device.

The drone docking station may further include a detection sensor configured to detect a position of the drone when the drone is accommodated on the guide panel, in which the control unit may rotate or slide the guide panel based on the position of the drone detected by the detection sensor.

The drone may be provided with a detection reference point detected by the detection sensor, and the detection sensor may identify the position of the drone by detecting the detection reference point.

A plurality of detection sensors may be spaced from each other on the side of the guide panel and may detect a position of the detection reference point provided in the drone, and the control unit may operate a rotation angle of the guide panel based on the position of the detection reference point detected by the detection sensors to rotate the guide panel.

The control unit may communicate with the drone through wireless communication, and control the guide panel to expand outward when receiving a docking signal from the drone.

The control unit may reduce the expanded guide panel if the detection sensor detects that the drone has landed on the guide panel, and rotate the guide panel so that the drone corresponds to a position of the cargo positioned in the transfer device.

A method for controlling the drone docking station for the vehicle according to an exemplary embodiment of the present disclosure includes: receiving a docking signal indicating that a drone is docked to the drone docking station; expanding a plurality of guide panels outward; sliding inward and rotating the plurality of guide panels so that the cargo positioned in a transfer device and a position of the drone correspond when the drone is docked to the guide panels; and operating the transfer device when the cargo and the position of the drone correspond.

The method may further include detecting a position of the drone to be docked, in which the controlling may slide or rotate the guide panel based on the position of the drone detected in the detecting.

The method may further include opening a sunroof glass covering the guide panel and the transfer device after the receiving of the docking signal.

The drone docking station for the vehicle according to an exemplary embodiment of the present disclosure may be provided with the guide panel on which the drone is docked to the roof of the vehicle and provided with the transfer device configured to transfer the cargo in the vertical direction of the vehicle on the center portion of the guide panel to transfer the cargo from the lower portion of the vehicle to the roof side through the transfer device when the drone is docked to the guide panel and to load the cargo on the drone or to transfer the cargo transferred from the drone from the roof side to the lower portion of the vehicle, conveniently delivering the cargo of the vehicle to the customer through the drone.

Furthermore, the plurality of guide panels may be formed, and the guide panel may be slid outward when the drone is docked, the guide panel may be slid toward the center portion when the drone is completely docked, and the guide panel may be rotated so that the drone is aligned to the cargo on the center portion of the guide panel, accurately loading the cargo on the drone.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions for exemplary embodiments of the present disclosure included in the present specification or application are only exemplified for describing the exemplary embodiments according to an exemplary embodiment of the present disclosure, and the exemplary embodiments of the present disclosure may be carried out in various forms and should not be interpreted as being limited to the exemplary embodiments described in the present specification or application.

Since the exemplary embodiment of the present disclosure may have various changes and have various forms, specific exemplary embodiments will be shown in the drawings and described in detail in the present specification or application. However, this is not intended to limit the exemplary embodiments according to the concept of the present disclosure to a specific disclosed form, and should be understood to include all changes, equivalents, or substitutes included in the spirit and technical scope of the present disclosure.

Terms such as first and/or second may be used to describe various components, but the components should not be limited to the terms. The terms are used only for the purpose of distinguishing one component from other components, and for example, a first component may be referred to as a second component, and similarly, the second component may also be referred to as the first component, without departing from the scope according to the concept of the present disclosure.

When a certain component is said to be "connected" or "coupled" to another component, it should be understood that the certain component may be directly connected or coupled to another component, but other components may also exist therebetween. On the other hand, when a certain component is said to be "directly connected to" or "directly coupled to" another component, it should be understood that other components do not exist therebetween. Other expressions for describing the relationship between components, that is, expressions such as "between" and "directly between" or "adjacent to" and "directly adjacent to" should also be interpreted in the same manner.

The terms used in the present specification are only used to describe the specific exemplary embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof, and do not exclude the presence or addition possibility of one or more other features, numbers, steps, operations, components, parts, or a combination thereof in advance.

Unless defined otherwise, all terms used herein, including technical or scientific terms, have the same meaning as commonly understood by those skilled in the art to which the present disclosure pertains. Terms such as those defined in commonly used dictionaries should be interpreted as having meanings consistent with the meanings in the context of the related art, and are not interpreted as an ideal or excessively formal meaning unless explicitly defined in the present specification.

Hereinafter, the present disclosure will be described in detail by describing preferred exemplary embodiments of the present disclosure with reference to the accompanying drawings. The same reference numerals presented in each drawing indicate the same members.

A control unit 10 according to an exemplary embodiment of the present disclosure may be implemented through a non-volatile memory configured to store data relating to an algorithm configured to control operations of various components of a vehicle or a software command reproducing the algorithm and a processor configured to perform an operation described below by use of the data stored in the corresponding memory. Here, the memory and the processor may be implemented as separate chips. Alternatively, the memory and the processor may be implemented as a single chip integrated with each other. A processor may take the form of one or more processors.

Figure 1:
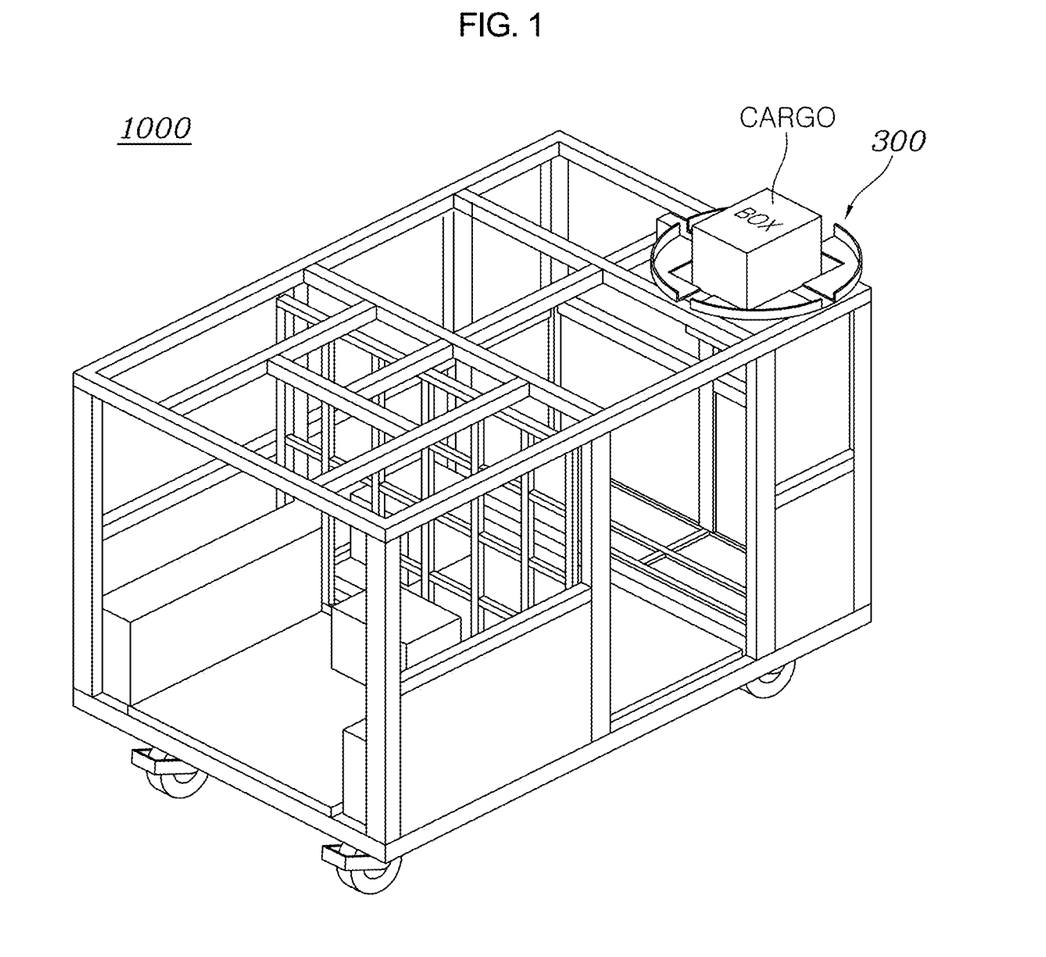
FIG. 1 is a perspective view in which a drone docking station for a vehicle according to an exemplary embodiment of the present disclosure is coupled to a freight vehicle.
Figure 2:
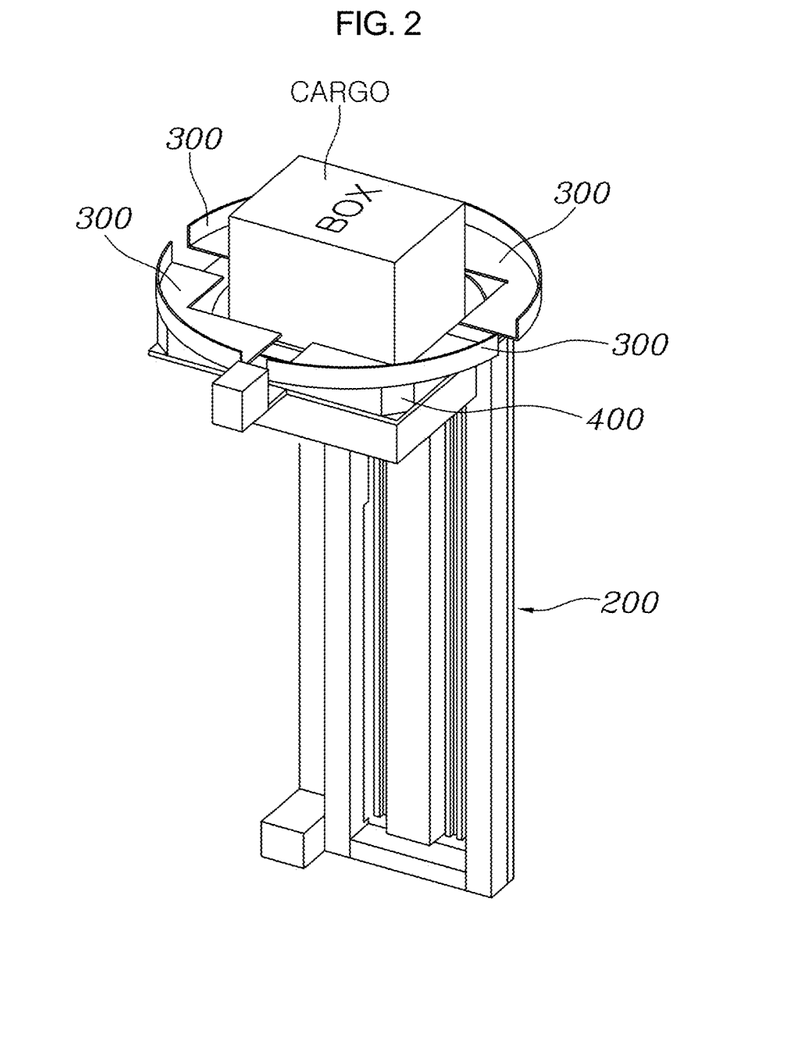
FIG. 2 is a perspective view of the drone docking station for the vehicle according to the exemplary embodiment of the present disclosure.
Figure 3:
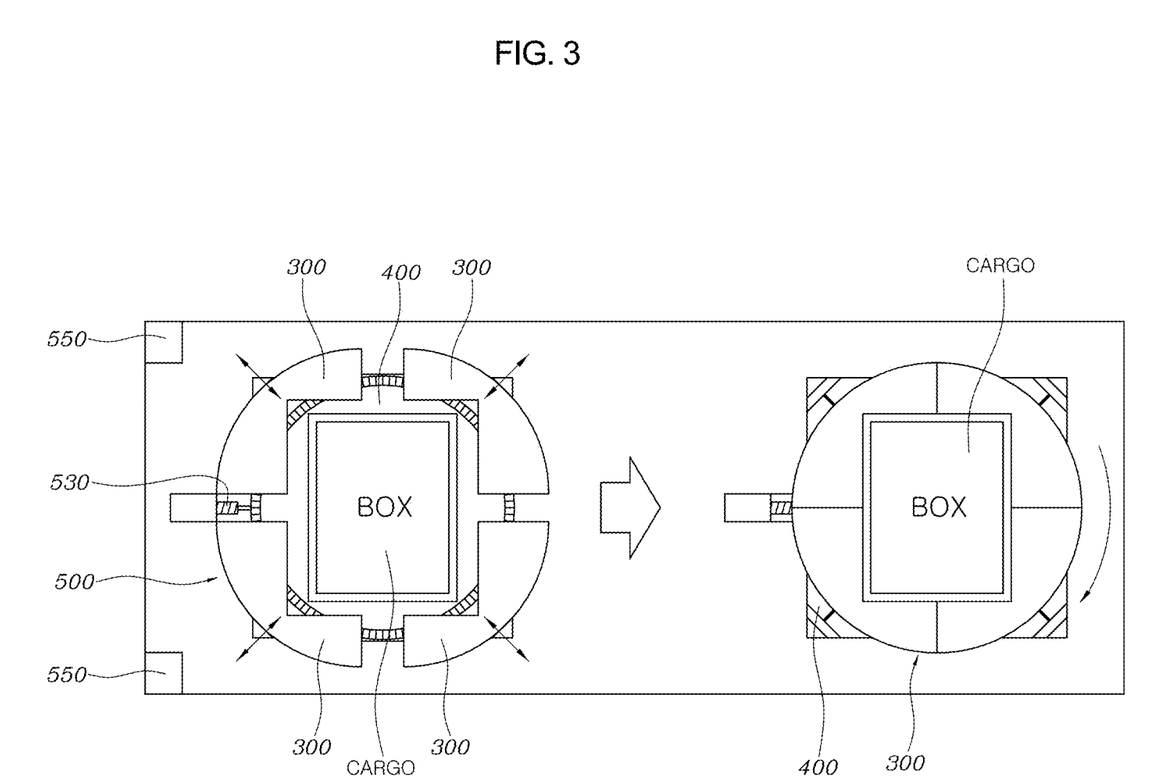
FIG. 3 is a view showing an operation of a guide panel of the drone docking station for the vehicle according to the exemplary embodiment of the present disclosure.
Figure 4:
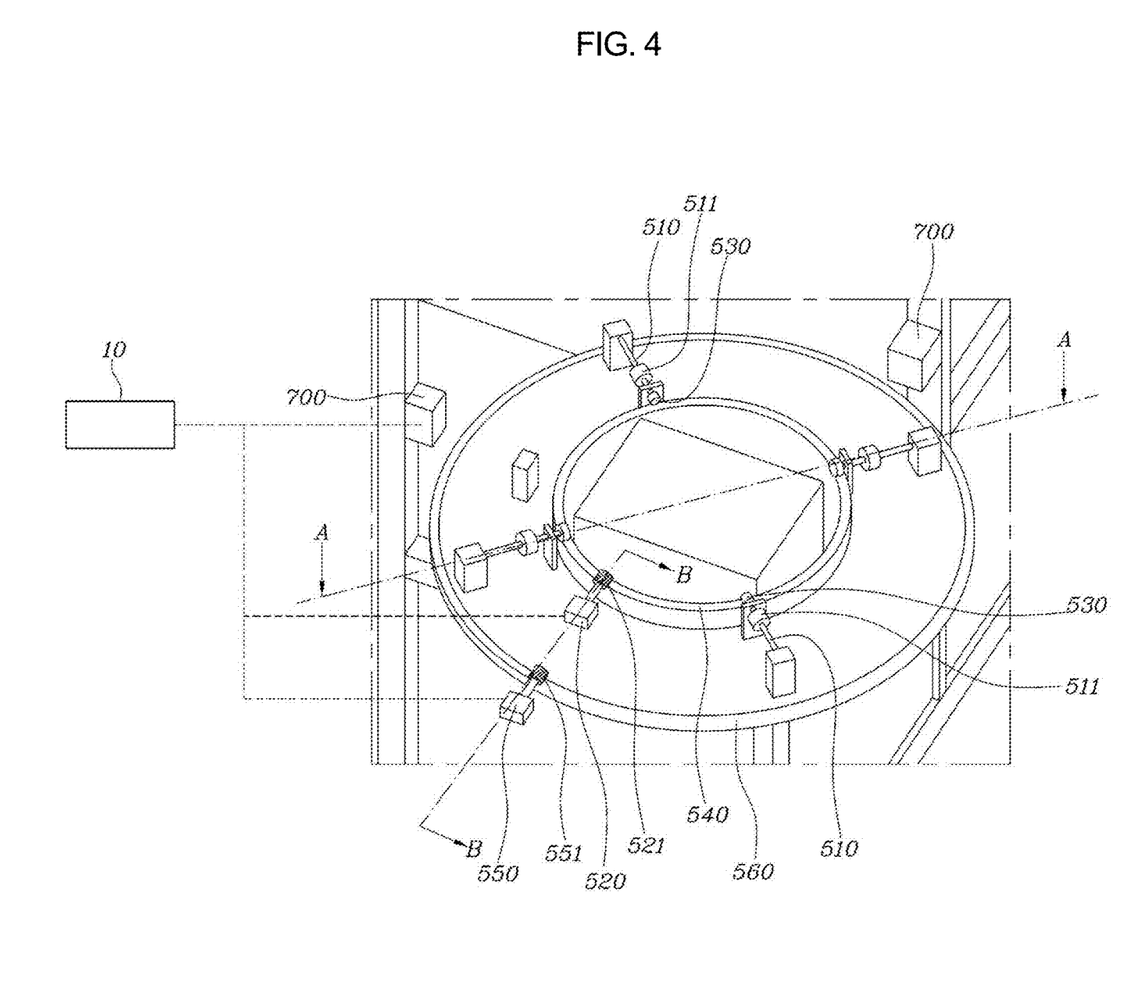
FIG. 4 is a perspective view of a base panel of the drone docking station for the vehicle according to the exemplary embodiment of the present disclosure.

FIG. 1 is a perspective view in which a drone docking station for a vehicle according to an exemplary embodiment of the present disclosure is coupled to a freight vehicle 1000, FIG. 2 is a perspective view of the drone docking station for the vehicle according to the exemplary embodiment of the present disclosure, FIG. 3 is a view showing an operation of a guide device including a guide panel 300 of the drone docking station for the vehicle according to the exemplary embodiment of the present disclosure, and FIG. 4 is a perspective view of a base panel 400 of the drone docking station for the vehicle according to the exemplary embodiment of the present disclosure.

An exemplary embodiment of the drone docking station for the vehicle according to an exemplary embodiment of the present disclosure will be described with reference to FIG. 1, FIG. 2, FIG. 3, and FIG. 4.

Recently, a purpose built vehicle (PBV) manufactured depending upon the purpose of the vehicle is being manufactured.

Therefore, the freight vehicle 1000 transporting a cargo among the purposes of the vehicle may be manufactured, and the present disclosure has been devised for a device configured to dock the drone 100 to the vehicle to deliver the cargo loaded in the freight vehicle 1000 to the customer through the drone 100.

As shown in FIG. 1, the drone docking station for the vehicle may be provided in a space separated from a loading space where the cargo is loaded on one side of the freight vehicle 1000, and therefore, the cargo may be loaded on the drone 100 or the cargo loaded on the drone 100 may be transported to the freight vehicle 1000.

The drone docking station for the vehicle according to an exemplary embodiment of the present disclosure includes: a transfer device 200 configured to load a cargo on the drone 100 or to vertically move the cargo transferred by the drone 100; a guide device including a guide panel 300 provided on a roof of the vehicle and connected to an upper end portion of the transfer device 200 to have the drone 100 accommodated on an upper portion thereof, and formed of a panel surrounding the transfer device 200 and provided to move outward or to be rotatable about a center portion thereof, and a control unit 10 configured to rotate or move the guide panel 300 so that the drone 100 corresponds to the cargo positioned in the transfer device 200 when the drone 100 is accommodated on the guide panel 300.

As shown in FIG. 2, the transfer device 200 may vertically extend to move the cargo from the bottom to the top or to move the cargo from the top to the bottom.

The drone 100 may vertically rise and vertically land through a propeller and therefore, be docked at the roof side of the vehicle. At the instant time, to dock the drone 100 landed on the roof side of the vehicle, the roof of the vehicle may be provided with the guide panel 300 and therefore, the drone 100 may be docked to the guide panel 300, and the guide panel 300 may be connected to the transfer device 200 to move the cargo from a lower portion to an upper portion of the vehicle by the transfer device 200 to load the cargo on the drone 100 accommodated on the guide panel 300 or to transfer the cargo transferred from the drone 100 from the roof side to the lower portion of the vehicle.

As shown in FIG. 3, when the drone 100 is accommodated on the guide panel 300, the guide panel 300 is formed of a plurality of panels, the center portion thereof is connected to the transport device 200, and the plurality of panels are slid to expand outward and therefore, the drone 100 may be stably landed on the guide panel 300.

Furthermore, the guide panel 300 slid outward is slid back toward the center portion thereof after the drone 100 is accommodated on the guide panel 300, and thereafter, the guide panel 300 is rotated around the center portion thereof to align the drone 100 with a position of the cargo so that the cargo transferred through the transfer device 200 is loaded on the drone 100 on the center portion of the guide panel 300, and therefore, the cargo and the drone 100 may be aligned, and the cargo may be loaded on the drone 100 or the cargo loaded on the drone 100 may be delivered to the transfer device 200.

The drone docking station for the vehicle according to an exemplary embodiment of the present disclosure may further include a base panel 400 provided under the guide panel 300 and provided with a through hole 420 through which the cargo passes by a center portion penetrated to be connected to the transfer device 200; and an actuator 500 provided above the base panel 400 and connected to the guide panel 300 to slide or rotate the guide panel 300.

As shown in FIG. 4, the base panel 400 provided under the guide panel 300 and connected to be rotatable with the roof panel may be provided, the base panel 400 and the guide panel 300 may be connected to each other, and the guide panel 300 may be connected to be slidable outwardly from the center portion of the base panel 400.

Furthermore, the actuator 500 coupled to the base panel 400 to rotate the base panel 400 around the center portion of the base panel 400 or to slide the guide panel 300 outward with respect to the center portion thereof may be provided to align the drone 100 to the cargo positioned on the center portion.

An exemplary embodiment of the actuator 500 will be described later.

Figure 5:
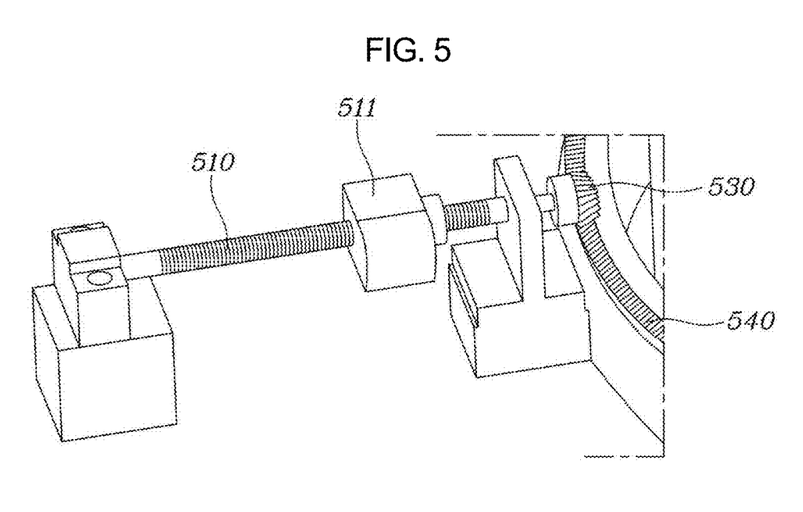
FIG. 5 is a view showing a lead screw and a screw nut of the drone docking station for the vehicle according to the exemplary embodiment of the present disclosure.
Figure 6:
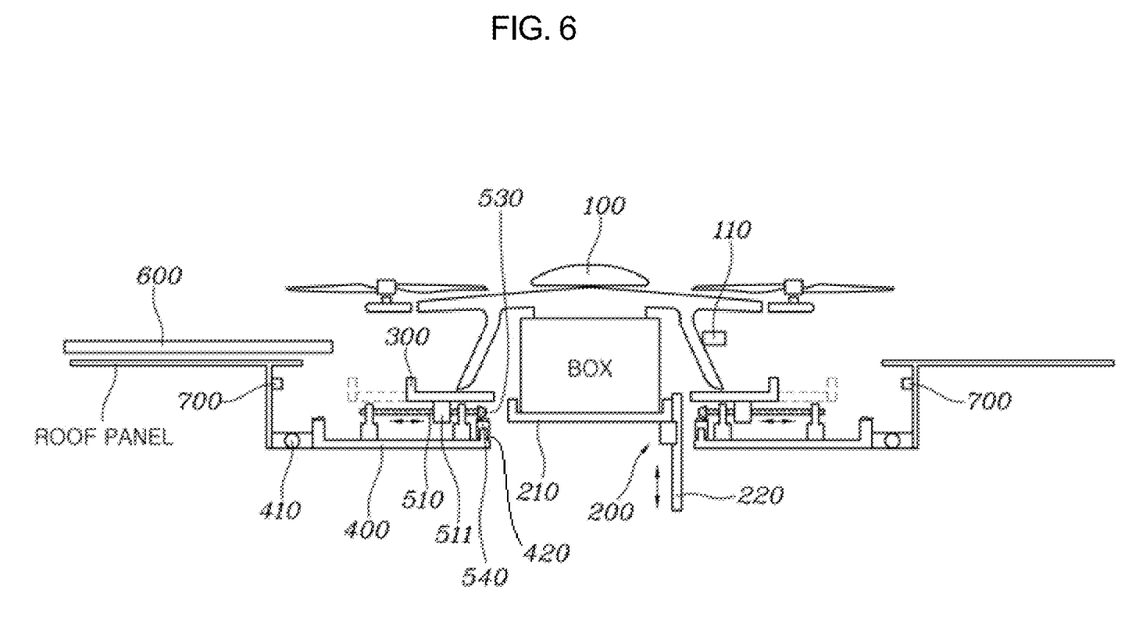
FIG. 6 is a cross-sectional view taken along line A-A of FIG. 4.
Figure 7:
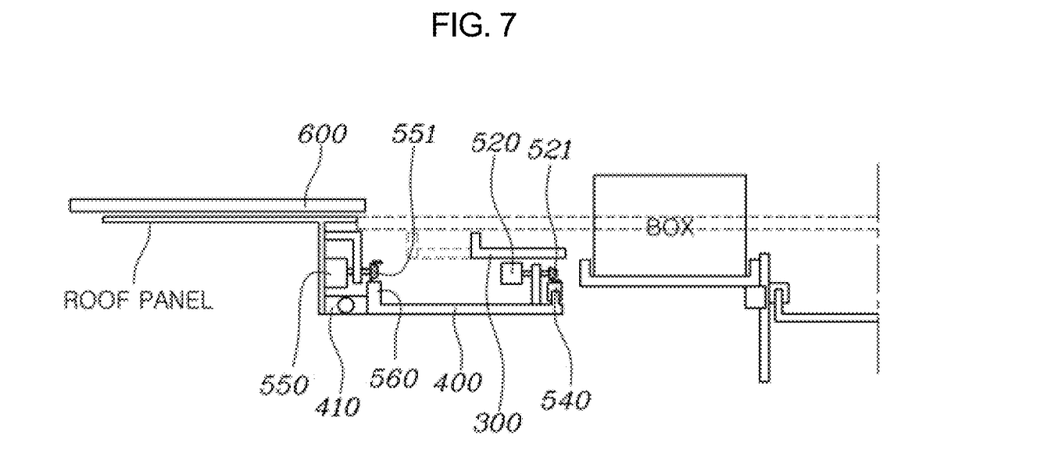
FIG. 7 is a cross-sectional view taken along line B-B of FIG. 4.

FIG. 5 is a view showing a lead screw 510 and a screw nut 511 of the drone docking station for the vehicle according to the exemplary embodiment of the present disclosure, FIG. 6 is a cross-sectional view taken along line A-A of FIG. 4, and FIG. 7 is a cross-sectional view taken along line B-B of FIG. 4.

The actuator 500 may include the lead screw 510 extending outwardly from the middle portion of the base panel 400, the screw nut 511 engaged with the lead screw 510 and moved in a direction in which the lead screw 510 extends depending upon the rotation of the lead screw 510 and coupled to the guide panel 300 on an upper portion thereof, and a first driving motor 520 connected to the lead screw 510 to rotate the lead screw 510.

As shown in FIG. 5, the lead screw 510 may be provided to extend outwardly from the center portion of the base panel 400, a plurality of lead screws 510 may be spaced from each other in a circumferential direction with respect to the center portion of the base panel 400, the screw nut 511 may be engaged with the lead screw 510 and moved in a longitudinal direction of the lead screw 510 depending upon the rotation of the lead screw 510, and the movement direction of the screw nut 511 may be changed depending upon the rotation direction of the lead screw 510.

Furthermore, the lead screw 510 may be connected to the first driving motor 520 to be rotated, and the control unit 10 may control the rotation of the first driving motor 520.

A plurality of first driving motors 520 may be provided to be connected to the lead screws 510, respectively, or a connection member connecting one first driving motor 520 to the plurality of lead screws 510 may be provided.

As the screw nut 511 is coupled to the guide panel 300 on the upper portion thereof and moved in the longitudinal direction of the lead screw 510 when the lead screw 510 is rotated, the screw nut 511 may slide the guide panel 300 in the longitudinal direction of the lead screw 510.

The lead screw 510 and a pinion gear may be provided to correspond to the number of the plurality of guide panels 300, the actuator 500 may include a first gear 530 provided on the end portion of the lead screw 510 and a first rack gear 540 formed in a shape of a circle to connect a plurality of first gears 530, the first driving motor 520 may be provided with a second gear 521 on a rotation shaft, and the second gear 521 may be connected to the first rack gear 540 to rotate the plurality of lead screw 510 depending upon the rotation of the first driving motor 520.

As shown in FIG. 4 and FIG. 5, the first gear 530 may be coupled to the end portion of the lead screw 510 to be rotated with the lead screw 510 to rotate the plurality of lead screws 510 by use of one first driving motor 520, and furthermore, the first rack gear 540 formed in an annular shape with respect to the center portion of the base panel 400 may be engaged with the first gear 530 to connect the plurality of lead screws 510 to connect the plurality of first gears 530. Furthermore, the second gear 521 coupled to the rotation shaft of the first driving motor 520 to be rotated may be provided, and the second gear 521 may be engaged with the first rack gear 540 to rotate the first rack gear when the first driving motor 520 is rotated. At the instant time, the first rack gear 540 may be rotated relatively with the base panel 400, and therefore, rotated to rotate the lead screw 510.

Therefore, it is possible to reduce the cost by rotating the plurality of lead screws 510 through one first driving motor 520.

The drone docking station for the vehicle according to an exemplary embodiment of the present disclosure may further include a rotation bearing 410 rotatably coupling the base panel 400 to a roof panel, and the actuator 500 may include a second driving motor 550 coupled to the roof panel side and connected to the base panel 400 to rotate the base panel 400 and the guide panel 300 connected to the upper portion of the base panel 400.

As shown in FIG. 7, the base panel 400 may be rotatably coupled to the roof panel through the rotation bearing 410. Therefore, when the base panel 400 is rotated, the guide panel 300 connected to the upper portion thereof may be rotated at the same time.

The actuator 500 may include a second rack gear 560 extending in a shape of a circle along an external surface of the base panel 400 and coupled thereto, and the rotation shaft of the second driving motor 550 may be provided with a third gear 551 engaged with the second rack gear 560 to rotate the second rack gear 560 depending upon the rotation of the second driving motor 550.

The second driving motor 550 may be coupled to the roof panel to rotate the present base panel 400, the third gear 551 may be coupled to the rotation shaft of the second driving motor 550, the second rack gear 560 formed in the annular shape along the outside of the base panel 400 and coupled to the base panel 400 may be provided, and the base panel 400 and the guide panel 300 may be rotated around the center portion as the third gear 551 and the second rack gear 560 are engaged with each other and the third gear 551 and the second rack gear 560 are rotated depending upon the operation of the second driving motor 550.

The first gear 530, the second gear 521, the third gear 551, the first rack gear 540, and the second rack gear 560 may be formed of a helical gear so that the circular rotation becomes smoother.

Figure 8:
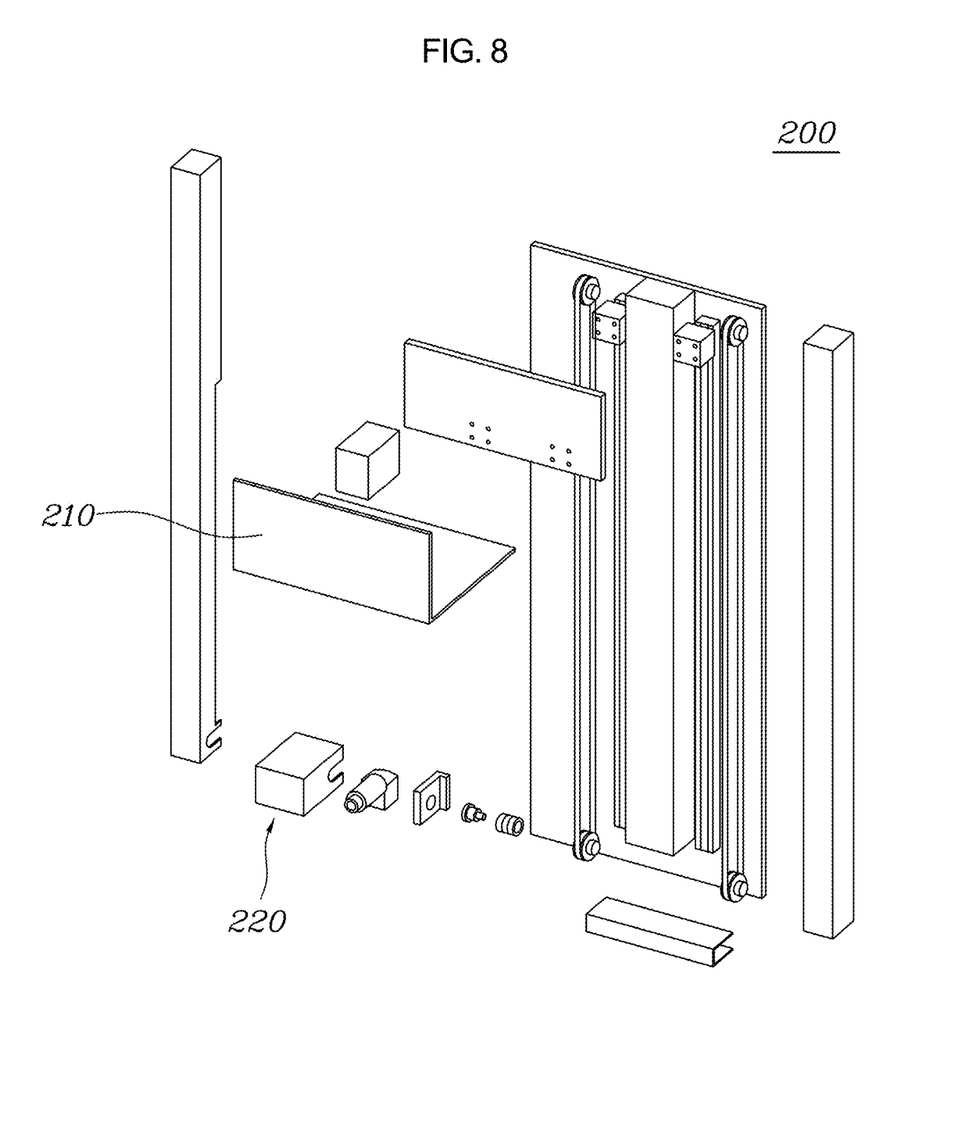
FIG. 8 is an exploded perspective view of a transfer device of the drone docking station for the vehicle according to the exemplary embodiment of the present disclosure.

FIG. 8 is an exploded perspective view of the transfer device of the drone docking station for the vehicle according to the exemplary embodiment of the present disclosure.

The transfer device 200 may include a rail vertically extending, a loading plate 210 connected to the rail to be vertically slid along the rail and having a cargo loaded thereon, and a driving device 220 coupled to the rail to vertically move the loading plate 210.

Further referring to FIGS. 1 and 8, an upper end portion of the transfer device 200 may be connected to the base panel 400 and the guide panel 300, and the transfer device 200 may transfer the cargo from the bottom to the top to load the cargo on the drone 100 or to transfer the cargo transferred through the drone 100 to the bottom.

The transfer device 200 may be provided with the loading plate 210 supporting the cargo, may have the rail, which vertically extends to allow the loading plate 210 to be slid thereon, provided on the side of the loading plate 210, and may be provided with the driving device 220 connected to the loading plate 210 and the rail to vertically move the loading plate 210 along the rail.

The driving device 220 may be formed in a structure that has a belt, pulley, and motor driving method, and as the loading plate 210 is connected to the belt and the motor rotates the pulley, the belt may be moved to vertically move the loading plate 210.

The above is an exemplary embodiment of the driving device 220, various types of driving devices 220 vertically moving the loading plate 210 may be provided.

The drone docking station for the vehicle according to an exemplary embodiment of the present disclosure may further include a sunroof glass 600 provided on the roof panel to cover the guide panel 300 and the transfer device 200.

As shown in FIG. 6 and FIG. 7, the sunroof glass 600 may be coupled to be slid on the roof panel, provided to be slid on the upper portion of the guide panel 300 and slid to prevent the rain or foreign substances from being introduced into the vehicle if the drone 100 is not docked to cover the upper portions of the guide panel 300 and the transfer device 200, and slid to open the guide panel 300 and the transfer device 200 if the drone 100 is docked.

Therefore, it is possible to protect the drone docking station for the vehicle from external foreign substances, and to prevent failure thereof.

The drone docking station for the vehicle according to an exemplary embodiment of the present disclosure may further include a detection sensor 700 configured to detect the position of the drone 100 when the drone 100 is accommodated on the guide panel 300, and the control unit 10 may rotate or slide the guide panel 300 based on the position of the drone 100 detected by the detection sensor 700.

As shown in FIG. 5, the detection sensor 700 may be provided on a side surface of the guide panel 300, the detection sensor 700 may confirm that the drone 100 has been accommodated on the guide panel 300, the detection sensor 700 may transmit a detection signal to the control unit 10 when detecting that the drone 100 has been accommodated on the guide panel 300, and at the instant time, the control unit 10 may control the first driving motor 520 or the second driving motor 550 to reduce the expanded guide panel 300 and to rotate the guide panel 300 so that the drone 100 and the cargo are aligned.

A detection reference point 110 detected by the detection sensor 700 may be provided in the drone 100, and the detection sensor 700 may detect the detection reference point 110 to identify the position of the drone 100.

A plurality of detection sensors 700 may be spaced from each other on the side of the guide panel 300 and may detect a position of the detection reference point 110 provided in the drone 100, and the control unit 10 may operate a rotation angle of the guide panel 300 based on the position of the detection reference point detected by the detection sensor 700 to rotate the guide panel 300.

The control unit 10 may communicate with the drone 100 through wireless communication, and control the guide panel 300 to expand outward when receiving a docking signal from the drone 100.

When receiving the docking signal from the drone 100, the control unit 10 may control the first driving motor 520 to expand the guide panel 300 outward, and therefore, the drone 100 may be stably accommodated on the guide panel 300 by increasing the area where the drone 100 is accommodated.

The control unit 10 may reduce the expanded guide panel 300 if the detection sensor 700 detects that the drone 100 has landed on the guide panel 300, and rotate the guide panel 300 so that the drone 100 corresponds to the position of the cargo positioned in the transfer device 200.

When the drone 100 is accommodated on the guide panel 300, the control unit 10 may control the first driving motor 520 to slide the guide panel 300 toward the center portion again to position the drone 100 to correspond to the cargo positioned on the center portion of the guide panel 300.

Furthermore, the detection sensor 700 may detect the position of the drone 100, and the control unit 10 may operate the rotation angle at which the drone 100 and the cargo correspond to each other based on the position of the drone 100 detected by the detection sensor 700, and rotate the base panel 400 by the operated rotation angle so that the drone 100 and the cargo accurately correspond to each other, accurately loading the cargo on the drone 100.

Figure 9:
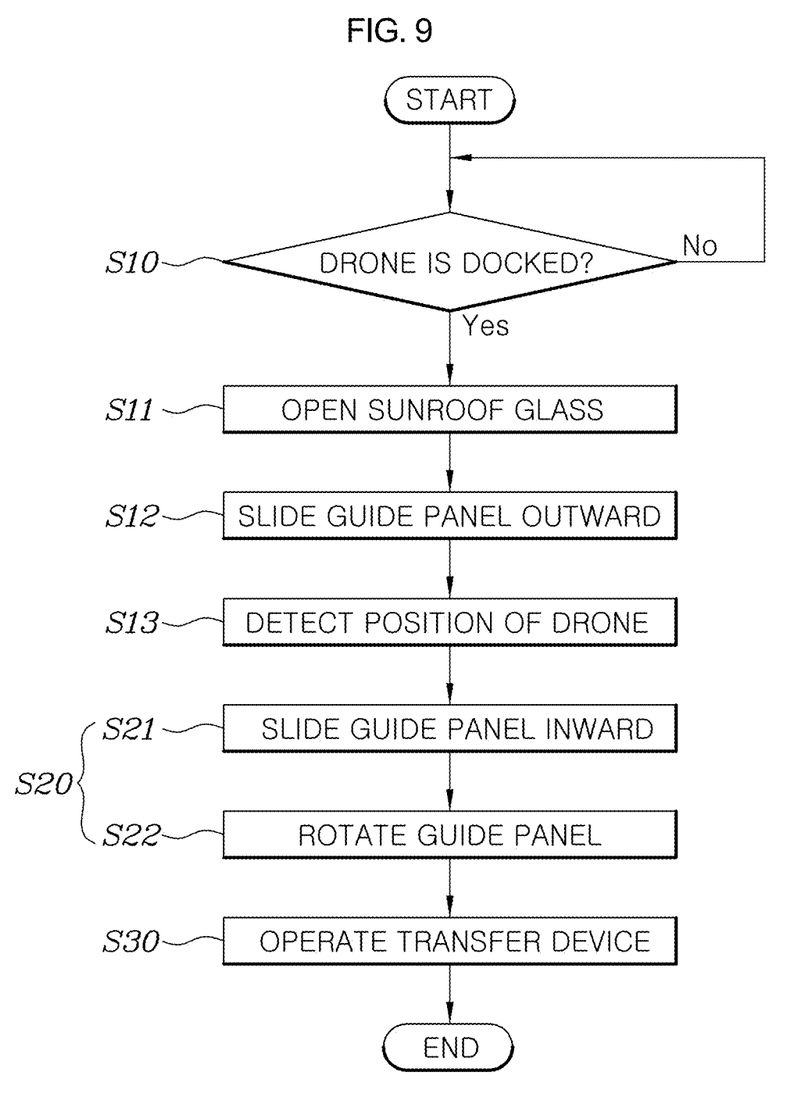
FIG. 9 is a flowchart of a method for controlling the drone docking station for the vehicle according to the exemplary embodiment of the present disclosure.

FIG. 9 is a flowchart of a method for controlling the drone docking station for the vehicle according to the exemplary embodiment of the present disclosure.

An exemplary embodiment of the method for controlling the drone docking station for the vehicle according to an exemplary embodiment of the present disclosure will be described with reference to FIG. 9.

A method for controlling the drone docking station for the vehicle according to an exemplary embodiment of the present disclosure includes a step of receiving a docking signal indicating that the drone 100 is docked to the drone docking station (S10); a step of expanding the plurality of guide panels 300 outward (S12); a step of sliding inward and rotating the plurality of guide panels 300 so that the cargo positioned in the transfer device 200 and the position of the drone 100 correspond when the drone 100 is docked to the guide panel 300 (S20); and a step of operating the transfer device 200 when the cargo and the position of the drone 100 correspond (S30).

The method for controlling the drone docking station for the vehicle according to an exemplary embodiment of the present disclosure may further include a step of detecting the position of the drone 100 to be docked (S13), and the step of sliding and rotating (S20) may slide or rotate the guide panel 300 based on the position of the drone 100 detected in the step of detecting.

A step of sliding inward the guide panel 300 (S21) may be performed upon detecting that the drone 100 is accommodated on the guide panel 300, and a step of rotating the guide panel 300 (S22) may be performed upon detecting the position of the drone.

The method for controlling the drone docking station for the vehicle according to an exemplary embodiment of the present disclosure may further include a step of opening the sunroof glass 600 covering the guide panel 300 and the transfer device 200 (S11) after the step of receiving the docking signal (S10).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A drone docking station for a vehicle, the drone docking station comprising:
    a transfer device configured to have a cargo loaded on a drone or to vertically move the cargo transferred by the drone;
    a guide device including a guide panel provided on a roof of the vehicle and engaged to an upper end portion of the transfer device to have the drone accommodated on an upper portion of the guide panel, wherein the guide panel is disposed to surround the transfer device and configured to move inward or outward or be rotated around a center portion of the transfer device; and
    a control unit electrically connected to the guide device and configured to rotate or move the guide panel so that the drone corresponds to the cargo positioned in the transfer device when the drone is accommodated on the guide panel; and
    a base panel provided under the guide panel and provided with a through hole through which the cargo passes by having a center portion penetrated and connected to the transfer device,
    wherein the guide device includes an actuator provided above the base panel and connected to the guide panel to slide or rotate the guide panel.

2. The drone docking station of claim 1, wherein the actuator includes:
    a lead screw extending outwardly from a center portion of the base panel;
    a screw nut engaged with the lead screw and moved in a longitudinal direction of the lead screw according to rotation of the lead screw, and coupled to the guide panel on an upper portion of the screw nut; and
    a first driving motor engaged to the lead screw to rotate the lead screw.

3. The drone docking station of claim 2,
    wherein the lead screw and the screw nut are provided to correspond to a number of a plurality of guide panels,
    wherein the actuator further includes a first gear provided on an end portion of each lead screw and a first rack gear formed in a shape of a circle and gear-engaged with the first gears, and
    wherein the first driving motor is provided with a second gear on a rotation shaft of the first driving motor, and the second gear is gear-engaged to the first rack gear to rotate the lead screws by rotating the first rack gear according to rotation of the first driving motor.

4. The drone docking station of claim 3, wherein the lead screws are aligned in a predetermined angular interval in a circumferential direction of the circle and in a radial direction of the circle.

5. The drone docking station of claim 1, further including a rotation bearing rotatably coupling the base panel to a roof panel.

6. The drone docking station of claim 1,
    wherein the base panel is rotatably coupled to a roof panel, and
    wherein the actuator further includes a second driving motor connected to the roof panel and engaged to the base panel to rotate the base panel and the guide panel connected to an upper portion of the base panel.

7. The drone docking station of claim 6,
wherein the actuator further includes a second rack gear extending in a shape of a circle along an external surface of the base panel and connected to the base panel, and
wherein a rotation shaft of the second driving motor is provided with a third gear engaged with the second rack gear to rotate the second rack gear according to rotation of the second driving motor.

8. The drone docking station of claim 1,
wherein the transfer device includes a rail vertically extending, a loading plate coupled to the rail and vertically sliding along the rail and having the cargo loaded on the loading plate, and a driving device coupled to the rail to vertically move the loading plate.

9. The drone docking station of claim 1, further including a sunroof glass provided on a roof panel to cover the guide panel and the transfer device.

10. The drone docking station of claim 1, further including a detection sensor configured to detect a position of the drone when the drone is accommodated on the guide panel,
wherein the control unit is configured to control the guide device to rotate or slide the guide panel based on the position of the drone detected by the detection sensor.

11. The drone docking station of claim 10,
wherein the drone is provided with a detection reference point detected by the detection sensor, and the detection sensor is configured to identify the position of the drone by detecting the detection reference point.

12. The drone docking station of claim 11,
wherein a plurality of detection sensors are spaced from each other on a side of the guide panel and detect a position of the detection reference point provided in the drone, and the control unit is configured to control a rotation angle of the guide panel based on the position of the detection reference point detected by the detection sensors to rotate the guide panel.

13. The drone docking station of claim 1,
wherein the control unit is configured to communicate with the drone through wireless communication, and is configured to control the guide panel to expand outward when receiving a docking signal from the drone.

14. The drone docking station of claim 13,
wherein the control unit is configured to reduce the expanded guide panel when the detection sensor detects that the drone has landed on the guide panel, and to rotate the guide panel so that the drone corresponds to a position of the cargo positioned in the transfer device.

15. A method for controlling the drone docking station for the vehicle of claim 1, the method comprising:
receiving a docking signal indicating that the drone is docked to the drone docking station for the vehicle;
expanding a plurality of guide panels outward;
controlling the plurality of guide panels to slide inward and rotate the plurality of guide panels so that the cargo positioned in the transfer device and a position of the drone correspond when the drone is docked to the guide panels; and
operating the transfer device when the cargo and the position of the drone correspond.

16. The method of claim 15, further including detecting a position of the drone and being docked,
wherein the controlling the plurality of guide panels includes sliding or rotating the guide panels based on the position of the drone detected in the detecting.

17. The method of claim 15, further including opening a sunroof glass covering the guide panel and the transfer device after the receiving of the docking signal.

18. A non-transitory computer readable storage medium on which a program for performing the method of claim 15 is recorded.

* * * * *